(12) United States Patent
Ramanathan et al.

(10) Patent No.: US 11,385,376 B2
(45) Date of Patent: Jul. 12, 2022

(54) ELECTRIC FIELD SENSING DEVICES AND SYSTEMS AND METHOD OF MAKING THE SAME

(71) Applicant: Purdue Research Foundation, West Lafayette, IN (US)

(72) Inventors: Shriram Ramanathan, West Lafayette, IN (US); Zhen Zhang, West Lafayette, IN (US); Derek Karl Schwanz, Inver Grove Heights, MN (US)

(73) Assignee: Purdue Research Foundation, West Lafayette, IN (US)

( * ) Notice: Subject to any disclaimer, the term of this patent is extended or adjusted under 35 U.S.C. 154(b) by 825 days.

(21) Appl. No.: 16/154,539

(22) Filed: Oct. 8, 2018

(65) Prior Publication Data
US 2020/0025966 A1    Jan. 23, 2020

Related U.S. Application Data

(60) Provisional application No. 62/570,012, filed on Oct. 9, 2017.

(51) Int. Cl.
*G01V 3/08* (2006.01)
(52) U.S. Cl.
CPC .................................. *G01V 3/088* (2013.01)
(58) Field of Classification Search
None
See application file for complete search history.

(56) References Cited

U.S. PATENT DOCUMENTS

| 2005/0001721 A1* | 1/2005 | Houston | B63B 71/00 340/539.22 |
| 2013/0073239 A1* | 3/2013 | Edmondson | E02B 1/006 702/65 |
| 2016/0091546 A1* | 3/2016 | Xia | G01R 29/0878 324/457 |

(Continued)

OTHER PUBLICATIONS

Mengerink, K.J. et al., A call for deep-ocean stewardship. Science 44, 696-698 (2014).

(Continued)

*Primary Examiner* — Patrick Assouad
*Assistant Examiner* — Haidong Zhang
(74) *Attorney, Agent, or Firm* — Purdue Research Foundation (57) ABSTRACT

An electric field sensing device. The device includes a substrate, a sensing medium capable of experiencing a change in its electrical resistivity in response to an electric field, and electrodes for use in measuring the change. A method of making an electric field sensing device. The method includes depositing on a substrate a sensing medium capable of experiencing a change in its electrical resistivity in response to an electric field emitted by an object; and placing electrodes for use in measuring the change. An electric field sensing system. The system contains a plurality electric field sensing devices, an arrangement of the plurality sensing devices in a way to detect spatial variation of electric field emitted by objects in an environment; a computer system capable of monitoring the sensing devices, and detecting and comparing differences between the electrical fields sensed by individual devices.

21 Claims, 11 Drawing Sheets

(56) References Cited

U.S. PATENT DOCUMENTS

2016/0248006 A1* 8/2016 Shi .................... H01L 45/08
2017/0309770 A1* 10/2017 Colli ................ H01L 29/42384

OTHER PUBLICATIONS

Dowling, D.R. et al., Acoustic remote esnsing. Annu. Rev. Fluid Mech. 47, 221-243 (2015).
Kalmijn, A.J., Electric and magnetic field detection in elasmobranch fishes. Science 218, 916-918 (1982).
Bedore, C.N. et al., Bioelectric fields of marine organisms: voltage and frequence contributions to detectability by electroreceptive predators. Physiol. Biochem. Zool, 86, 298-311 (2013).
Shi, J. et al., Colossal resistance switching and band gap modulation in a perovskite nickelate by electron doping. Nat. Comm, 5, 4860 (2014).
Zhang, Z. et al., Perovskite nickelates as electric-field sensors in salt water. Nature, 553, 68 (2018).

* cited by examiner

ELECTRIC FIELD SENSING DEVICES AND SYSTEMS AND METHOD OF MAKING THE SAME

CROSS-REFERENCE TO RELATED APPLICATIONS

The present U.S. patent application is related to and claims the priority benefit of U.S. Provisional Patent Application Ser. No. 62/570,012 filed Oct. 9, 2017, the contents of which are hereby incorporated by reference in their entirety into the present disclosure.

STATEMENT REGARDING GOVERNMENT FUNDING

This invention was made with government support under Contract No. W911NF1610042 awarded by Army Research Office, and under Contract No. FA9550-16-1-0159 awarded by the Air Force Office of Scientific Research. The government has certain rights in the invention.

TECHNICAL FIELD

The present disclosure generally relates to devices and systems to detect electric fields, especially those emitted by marine animals and manmade vessels in aqueous environments.

BACKGROUND

This section introduces aspects that may help facilitate a better understanding of the disclosure. Accordingly, these statements are to be read in this light and are not to be understood as admissions about what is or is not prior art.

Although our planet is covered mostly by oceans which not only provide us large amount of energy and food but also play a key role in the global climate and sustainability, our understanding and exploitation of oceans are still limited by the grand challenge in sensing the complex and harsh environments in oceans. Over the past century, mimicking the dolphin, active acoustic sonar has been utilized to locate the vessels on the surface and underwater by sensing the acoustic wave generated or reflected from them. However, beside disturbing marine organisms, to generate acoustic wave actively, the sonar systems not only consume large amount of energy but are also hard to be made small and lightweight. In the meantime, new type of information is demanded as we explore further on oceans. For example, oceanographers require physical and chemical information such as temperature, salinity, acidity, pressure to understand the change of climate, while marine biologists are interest in understanding the behavior of marine organism in various depths of oceans. Thus, developing new multi-functional, multi-modal, passive sensing systems with low energy consumption, small dimension, light weight, and ultrahigh sensitivity becomes crucial to monitor but not disturb the aquatic life, integration of diverse functions in one unit, and ability to communicate information to satellites via on-chip electronics.

Thus, there exists an unmet need for devices and systems to detect electric fields emitted by marine animals and manmade vessels in aqueous environments that are multi-functional, lightweight, highly sensitive and less expensive than currently available systems.

SUMMARY

An electric field sensing device is disclosed. The sensing device includes a substrate, a sensing medium deposited on the substrate, wherein the sensing medium is capable of experiencing a change in its electrical resistivity in response to an electric field emitted by an object, two or more electrodes configured to be utilized in measuring the change in electrical resistivity of the sensing medium in response to an electric field, and optionally a capping layer capable of encapsulating the substrate, the sensing medium and the two or more electrodes.

A method of making an electric field sensing device is disclosed. The method includes providing a substrate, depositing on the substrate by physical or chemical vapor deposition or solution deposition methods a sensing medium capable of experiencing a change in its electrical resistivity in response to an electric field emitted by an object; and placing two or more electrodes configured to be utilized in measuring the change in electrical resistivity of the sensing medium in response to an electric field.

An electric field sensing system is disclosed. The system includes one or more electric field sensing devices, wherein the one or more electric field sensing devices contains a substrate, a sensing medium capable of sensing an electric field deposited on the substrate, two or more contact electrodes in contact with the sensing medium such that the two or more electrodes are configured to be utilized in measuring the change in electrical resistivity of the sensing medium in response to an electric field, and a capping layer capable of encapsulating the substrate, the sensing medium and the two electrodes; an arrangement of sensing devices in a way to detect spatial variation of electric field emitted by objects in an environment; a computer system capable of monitoring the sensing devices, and detecting and comparing differences between individual devices.

BRIEF DESCRIPTION OF THE FIGURES

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Further schematic representations are utilized for illustrative purposes only and not for scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the unmet need, this disclosure describes a sensing device, and a system is to detect electric fields emitted by marine animals and manmade vessels in aqueous environments. The sensing medium utilized in the device and system operates utilizing an electric-field-driven water-mediated phase transition, strikingly similar mechanism to sharks. This sensing system possessing ultrahigh sensitive and low dimensionality is well suited to cover the outer surface of naval vessels (floating or submersed) or submersible floats and for sampling the complex aqueous environment in rivers, lakes, and oceans.

In this disclosure, we use the term "sensing medium" to mean a material whose electrical resistivity changes in response to an electric field emitted by an object. Materials which exhibit this characteristic are suitable candidates to be used as a sensing medium in the electric field sensing device of this disclosure. For purposes of this disclosure the object is any body with mass that emits an electric field. Typical bodies of interest that emit an electrical field in an aqueous environment can be, but not limited to, ships, animals, organisms, and even oceanic currents.

In this disclosure, an ultrahigh sensitive electric field sensing device constituted by thin film oxide electronic devices is disclosed. The sensing device can detect electric bias as low as 4.5 μV, which spans bioelectric potentials generated by numerous marine species (15.0 μV~0.1 V) all the way up to galvanic potentials from ship and unmanned underwater vehicles (~1.0 V). Even lower voltages down to 1 nV may be sensed by optimizing the film thickness and device geometry. Many of these sensing devices can be arranged in an array and distributed in space to form a sensing system. The electric field sensing system of this disclosure therefore enables to locate objects in oceans including but not limited to marine organisms, ship and unmanned underwater vehicles (UUV) passively by detecting the electric field emitted during their biological process, and galvanic potentials during corrosion. Similar to sharks, this electric field sensing system can also be utilized in navigations by detecting the electric field generated by the geological ocean currents.

Figure 1A:
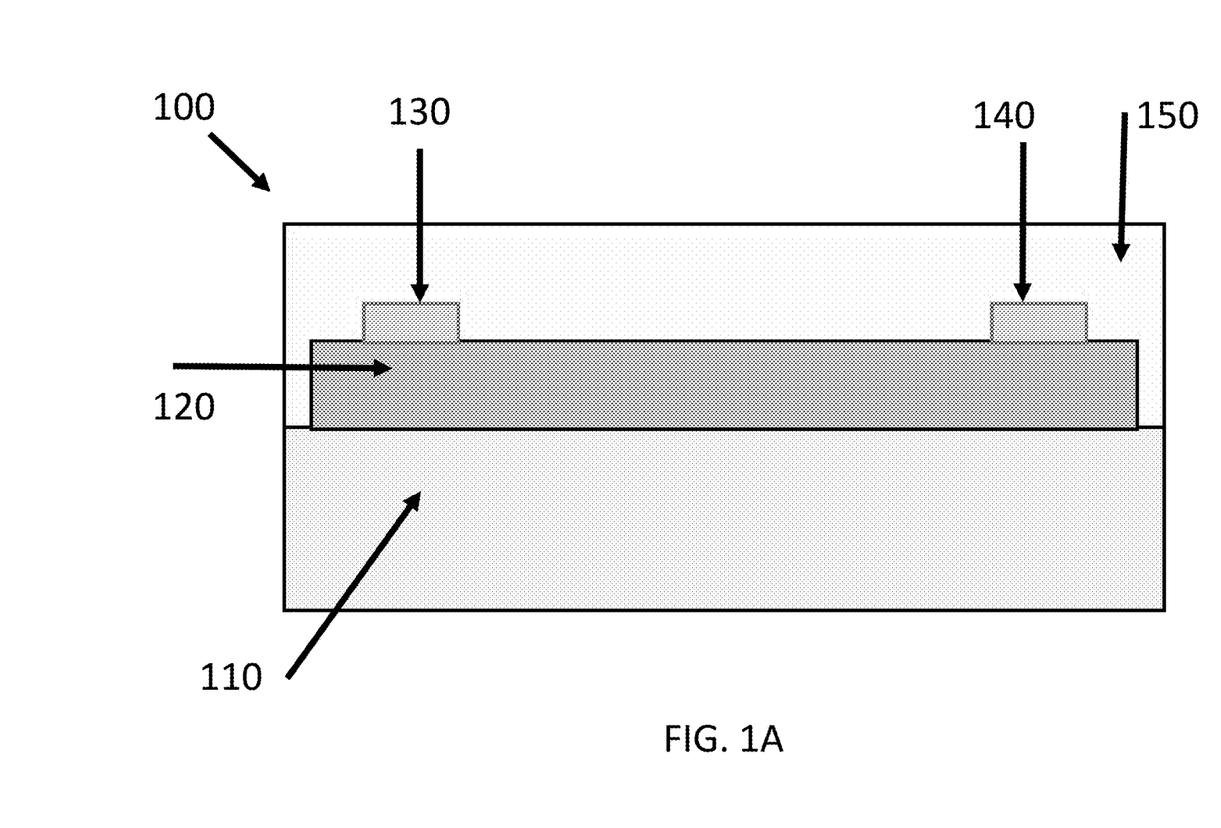
FIG. 1A is a side view of an electric field sensing device of this disclosure containing a substrate, sensing medium, electrodes, and capping layer.
Figure 1B:
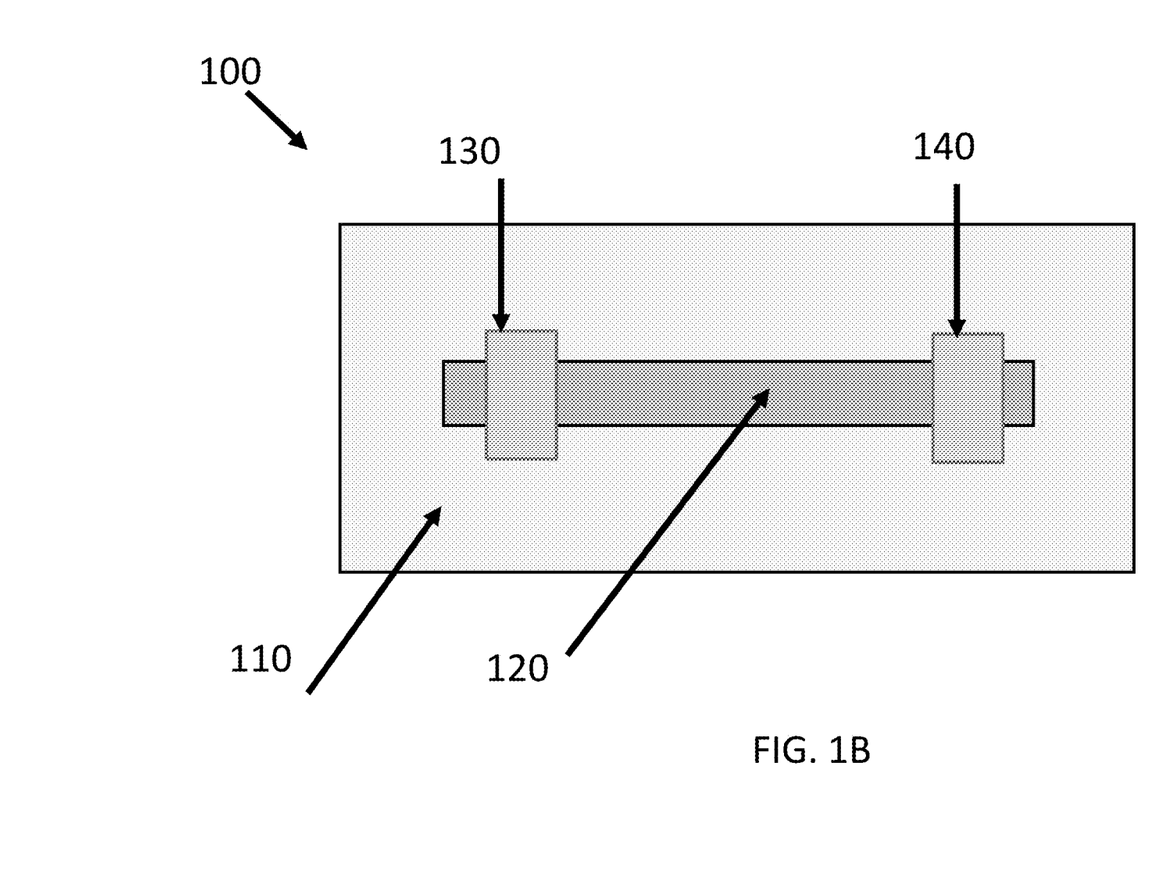
FIG. 1B is a top view of the sensing device of this disclosure, wherein the sensing medium is fabricated to channel shape and the sensing signals are read out from contact electrodes.

FIGS. 1A and 1B show the electric field sensing device of the system. FIG. 1A is a side view of an electric field sensing device 100 of this disclosure containing a substrate 110, sensing medium 120 deposited on the substrates, electrodes 130 and 140 formed or deposited on the sensing medium and extending on two sides of the substrate on either side of the sensing medium as shown in FIG. 1A, and a capping layer 150 which is optional and which is a conformal coating enclosing the substrate, the sensing medium and the electrodes. The electrodes can be metals such as Pt or Au with adhesion layers such as Ti and Cr deposited underneath to promote adhesion of the electrodes to the sensing medium. They can be deposited by one of several deposition methods such as sputtering, electron beam evaporation, atomic layer deposition etc. It should be noted that the electric field sensing device 100 of this disclosure typically includes a measurement system (not shown in FIG. 1A), capable of recording a signal corresponding to the magnitude of the electric field sensed by the sensing medium. Such a measurement system typically includes a meter and a power supply combination connected to the electrodes 130 and 140, capable of reading a signal corresponding to the magnitude of the electric field sensed by the sensing medium. The measurement system measures the change in resistance of the sensing medium when it is exposed to different water environments. This change in resistance is a function of the electric field it is exposed to and therefore serves as a sensing device. FIG. 1B is a top view of the electric field sensing device 100 of this disclosure shown in FIG. 1A. Referring to FIG. 1B, the sensing medium 120 is fabricated on substrate 110 in a rectangular shape, and the sensing signals are read from electrodes 130 and 140. Such shapes are generally termed as channels or channel shapes by those skilled in the art. Thus the term channel to describe such shapes is well understood by one of skill in the art. The capping layer 150 of FIG. 1A is now shown in FIG. 1B, and as in the case of FIG. 1A, a measurements system is not shown in FIG. 1B.

The electric field sensing device 100 of this disclosure is sometimes referred to as "sensing device" in this. Thus in this disclosure the terms "electric field sensing device" and "sensing device" are used interchangeably. In some instances, in this disclosure, such as in FIG. 1C, it is also termed E-sensing device". In the fabrication of the sensing device 100, the substrate 120 can be formed by a variety of materials. The substrate can be made of a conductor material such as, but not limited to, metals, Indium-tin oxide (ITO), and Nb—SrTiO$_3$. The substrate can also be made of insulating materials such as, but not limited to, Si, Si$_3$N$_4$, SiO$_2$, and LaAlO$_3$. Further, the substrates can also be made of flexible organic and inorganic materials such as Polyethylene terephthalate (PET) and other plastics or thinned substrates (thickness less than 0.5 mm down to 0.1 microns) such as glass or quartz, In the fabrication of the sensing device 100, a preferred sensing medium is a perovskite nickelate. Perovskite nickelates are strongly correlated oxide systems with chemical formula as $RNiO_3$, where R is rare earth element such as but not limited to Sm, Nd, Eu, Gd, Dy, Y, Lu, Pr, La, etc. Other sensing media can include tungsten trioxides, nickel oxides where electrons or ions can be easily doped into the material. In some preferred embodiments of this disclosure a perovskite nickelate is utilized as the sensing medium 120. It should be recognized that in some embodiments of the sensing device 100 of this disclosure, the sensing medium 120 can comprise more than one perovskite nickelate. It is also possible for the sensing medium 120 to contain one or more perovskite nickelates in combination with other sensing media such as oxide systems mentioned above.

The contact electrodes 130 and 140 of the sensing device 100 can be made from Pt, Au, Pd, Ag, and so on by deposition techniques such as sputtering or electron-beam evaporation or chemical vapor deposition or sometimes using metal paint. The capping layer, which is optional and which when employed, is made of a proton-conductive materials such as but not limited to proton conducting polymers NAFION®, Teflon®, proton conductive oxide $Cr_2O_3$, yttrium-doped barium zirconate (BYZ), etc. The capping layer is utilized to cover the sensing medium and contact electrodes to protect them from shock electric field loading and corrosion, which therefore increases the lifetime and reliability of sensing devices. The capping layer is optional and can be used in cases where the direct exposure to water environment may not be desirable. The cap layer could be few tens of nm to a few hundred nm thick so it allows rapid diffusion of ions into the sensing medium. The cap layer can be deposited by vapor deposition or chemical deposition techniques. If it is a standalone piece, then it could be pressed onto the nickelate sensing device surface.

The device shown in FIG. 1A can be made by the combination of various synthesis methods, lithography, and metallization methods. A representative procedure is as follows. A silicon substrate is cleaned with isopropanol and blow-dried with Argon gas before depositing a sensing medium. Then, sensing medium, $SmNiO_3$ (as a representative of perovskite nickelates), is deposited by magnetron co-sputtering of Sm and Ni targets under flowing of the gas mixture of 40/10 sccm $Ar/O_2$ in 5 mtorr. The as-grown $SmNiO_3$ thin film (~70 nm) is subsequently annealed in 1400 psi pure oxygen gas at 500° C. for 24 h to ensure its crystallinity. It should be noted, as mentioned earlier in this description, that sensing medium is not limited to single perovskite nickelate layer, and hence combining several layers of perovskite nickelate or using layers of different perovskite nickelates is also feasible. The sensing channel (i.e. the channel made of the sensing medium or medium) and contact electrodes can be fabricated with conventional lithography and lift-off method. For example, the $SmNiO_3$ channel can be made by reactive-ion-etching method with lithographic mask and then Pt electrode can be deposited on top of $SmNiO_3$ channel by e-beam evaporation and lift-off method. Finally, the region of sensing channel and Pt electrodes can be capped with either thin yttrium-doped barium zirconate layer (~10 nm) deposited by magnetron sputtering method or Nafion™ film applied with spin coating. The fabrication methods for the channel made of the sensing medium or medium 120 and the centrodes 130 and 140, and the method of forming the capping layer 150 are well known to those skilled in the art.

It is advantageous to keep the thickness of the sensing medium low and hence thin-film deposition methods are preferred. For this reason, in this disclosure, this sensing medium is sometimes referred to as thin film electric field sensing device. For the same reason, in this disclosure, the perovskite nickelates are also sometimes referred to as thin film perovskite nickelates.

Figure 1C:
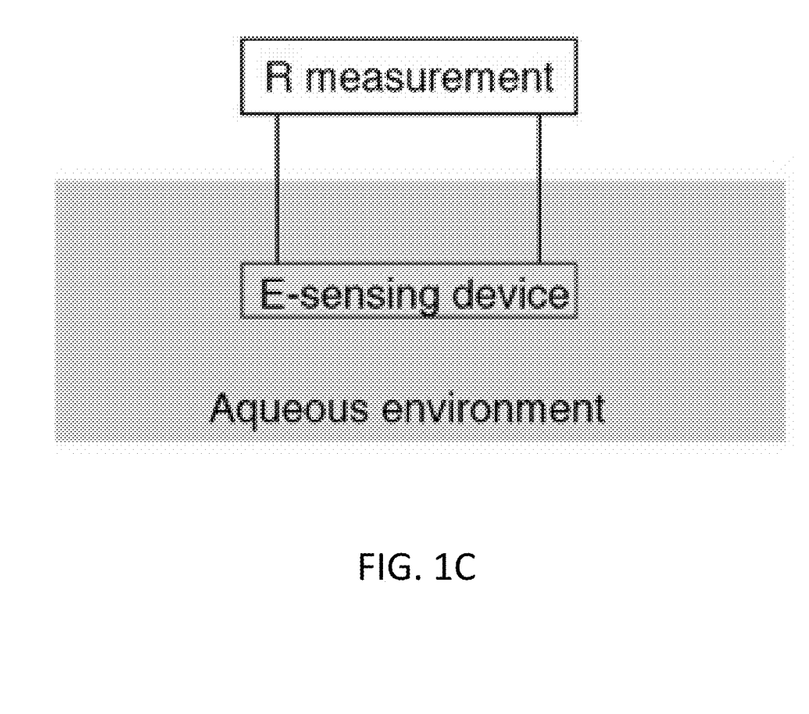
FIG. 1C is a representation of an electric field sensing device of this disclosure which is submersible in aqueous environment.

FIG. 1C is a schematic representation of an electric field sensing device of this disclosure which is submersible in aqueous environment. In FIG. 1C R in "R measurement" stand for electrical resistance. It should be noted that the sensing medium $RNiO_3$ itself is submersible. The capping layer can be used in cases where the direct exposure to water environment may not be desirable, such as in situations where the environment is extremely corrosive. It should be recognized that the capping layer may limit the strength of the electric field reaching the sensing medium. The device is submersible in liquids, such as but not limited to, ocean water with high salinity, river and lake water with low salinity, weak acidic or basic aqueous solutions, and organic and aprotic solvents. Under electric field, the sensing medium (e.g. perovskite nickelates) uptakes protons from the liquid, which enables the sensing medium to transform reversibly from low resistance state to high resistance state due to strong correlation of electrons. The sensing medium can change resistance by 8-9 orders of magnitude upon uptaking 1 proton per formula unit, which is 10,000~100,000× higher than conventional oxide materials (such as $WO_3$, $TiO_2$, ZnO, etc). The resistance of sensing medium (R measurement in FIG. 1C) can be read out by high resolution ohm meter, lock-in amplifier system in amplitude or phase sensitive mode, ac impedance measurement, and so on. Thus, to using this device, for example, the low dimension sensing devices can be deployed in oceans and placed at the position of interest, for example, detecting the presence of manmade underwater vehicles at certain position. A GPS unit can further be integrated with the sensing device to provide real-time high-resolution position information. Then the electrical resistance of the devices can be monitored with resistance measurement unit connected to the devices. Whence a vehicle is presented in tens centimeter away, the sensor can detect the vehicle by its galvanic potentials. The user can further reconstruct the detailed information of the vehicle (position, shape, size, trace, etc.) from a network made with few—thousands of such sensing devices.

From the above it is seen that the environment, which in this description, is a liquid should be an ionic conductor capable of conducting ions such as protons. Thus, a requirement for the electric field sensing device of this disclosure is that the environment in which the device and the object emitting the electric field should be such that there is ionic conduction between the object and the device.

The sensing medium or medium 120 (perovskite nickelates) are synthesized by evaporation, physical vapor deposition or chemical vapor deposition methods on substrates. The thickness of the perovskite nickelates ranges from 0.3 nm to 10 micrometers. The synthesis temperature ranges from room temperature to 700° C. under oxygen partial pressure from 10 to $10^7$ Pa. The formation of perovskite nickelate can be improved further by long annealing period at 400-800° C. in oxygen gas with pressure of $>10^7$ Pa after deposition. The thin film perovskite nickelates are fabricated to devices with various geometries by various methods including lithography and chemical etching; and metal contacts can be deposited by physical deposition method, including, but not limited to e-beam evaporation, pulsed laser deposition, sputtering, etc.

Figure 1D:
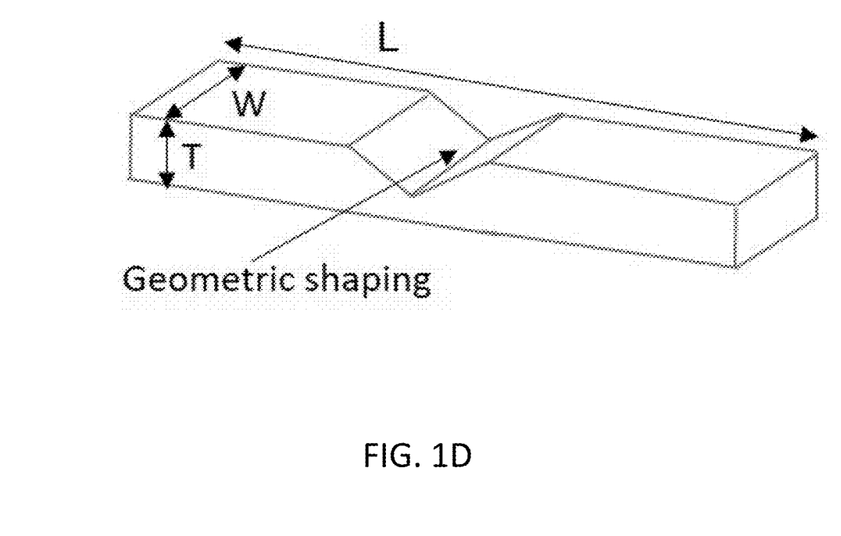
FIG. 1D is a schematic representation of geometric shaping of sensing medium (in this example, perovskite nickelates), where sensitivity of the sensing devices of this disclosure can be enhanced.

FIG. 1D is a schematic representation of one example of geometric shaping of sensing medium (in this example, a perovskite nickelate), where sensitivity of the sensing devices of this disclosure can be enhanced. Referring to FIG. 1D, the geometric shaping of sensing medium can enhance its sensitivity by such methods as reducing film thickness T (e.g. several unit cell thickness), using narrower channel width W (e.g. nanometer range), using shorter channel length L (e.g. nanometer range), fabricating nanostructures (e.g. nanowires), (nanostructures not shown in FIG. 1D, or by enlarging the local electric field with tuning curvature of sensing medium (e.g. geometric tip effect).

In the following paragraphs, the working principles of the electric field sensing device are described. The data and characterization presented here is gleaned from experiments leading to this disclosure, in which an embodiment of the of the sensing device of this disclosure was constructed utilizing: perovskite nickelate $SmNiO_3$ (SNO) with a thickness of about 80 nm as sensing medium deposited on a silicon substrate with a thickness of 0.5 mm on which there is a $SiO_2$ layer of thickness of about 300 nm). The SNO was deposited by the method of physical or chemical vapor deposition. In this embodiment, two electrodes were are made of Ti/Au and formed by the method of e-beam evaporation, and the capping layer 150 employed was BYZ formed by physical vapor deposition to a thickness of about 50 nm. The electrical resistance in response to the electric field sensed by the device 100 was measured by a measurement/recording system comprising ohm meter, computer, and data collecting software.

Figure 2A:
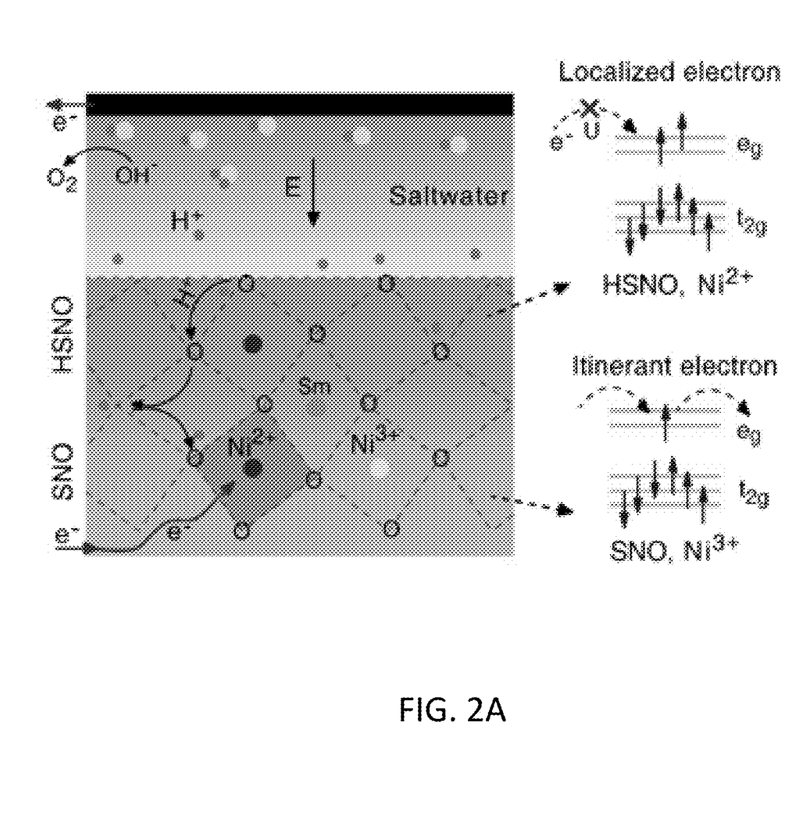
FIG. 2A is illustration of the saltwater-mediated phase transition in perovskite nickelate (e.g. $SmNiO_3$ (SNO)).

The working principle of sensing medium (perovskite nickelates) is shown in FIG. 2A. FIG. 2A is an illustration of the saltwater-mediated phase transition in perovskite nickelate (e.g. $SmNiO_3$ (SNO)). Perovskite nickelates (e.g., $SmNiO_3$ (SNO)) are submerged in water in the presence of an electric bias generated by a counter electrode. Under bias, the protons intercalate and diffuse into SNO lattice accompanied by electron transfer from counter electrode. The electronic structure of Ni 3d orbital changes into half filling in H-doped SNO. The electrons become localized in HSNO due to strong Coulomb repulsion in doubly occupied $e_g$ orbitals. As a result, a saltwater-mediated transition from the pristine nickelates to the hydrogenated nickelates phase occurs under bias. Distinct from chromic oxides such as $WO_3$ where transition to a metallic state occurs upon cation doping, accompanied with such proton influx is an entire modification of the electronic configuration of the Ni 3d orbitals. The doping-driven resistance change for 1e-/SNO is ~10,000× larger compared to $WO_3$. The partially filled $e_g$ orbital with low transport gap for charge carriers in nickelates becomes half-filled in hydrogenated nickelates where strong Mott-Hubbard electron-electron interaction arises and localizes the charge carriers.

Figure 2B:
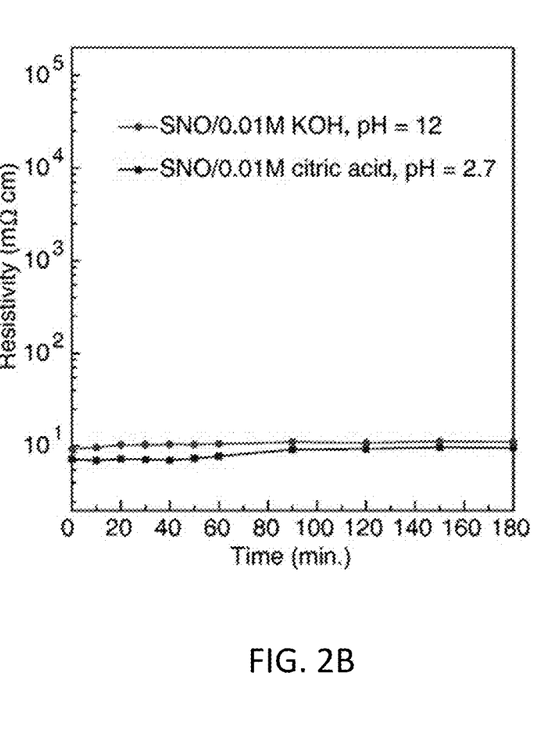
FIG. 2B is electrical resistivity of perovskite nickelate (e.g. $SmNiO_3$ (SNO)) after being submerged in 0.01 M KOH and 0.01 M citric acid respectively.

FIG. 2B shows electrical resistivity of perovskite nickelate (e.g. $SmNiO_3$ (SNO)) after being submerged in 0.01 M KOH and 0.01 M citric acid respectively. The electrical resistivity of perovskite nickelate shows minimal variation over a wide range of pH for 180 min. Referring to FIG. 2B, after being submerged in 0.01 M KOH and 0.01 M citric acid respectively, the electrical resistivity of perovskite nickelates (e.g., $SmNiO_3$ (SNO)) shows minimal variation over a wide range of pH for 180 min, indicating the sensing media perovskite nickelates are robust in aquatic environment.

Figure 2C:
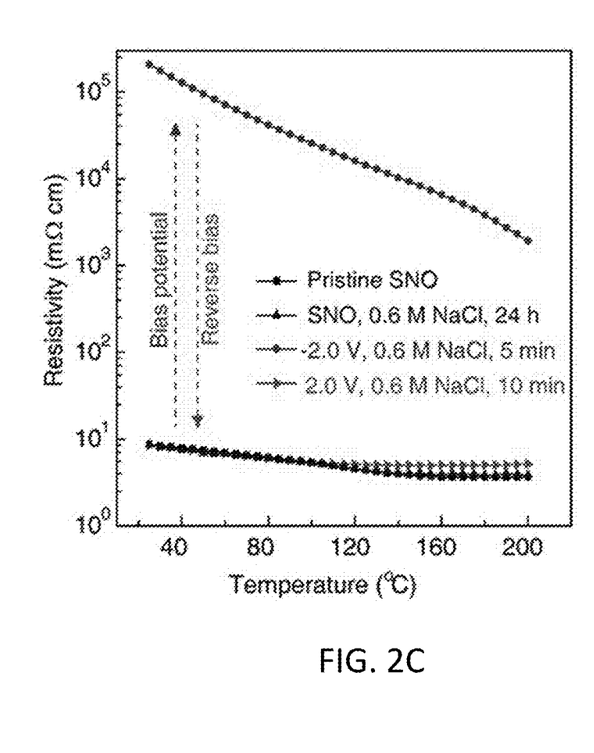
FIG. 2C shows temperature dependent electrical resistivity of perovskite nickelate (e.g. $SmNiO_3$ (SNO)) upon electric field sensing.

FIG. 2C shows temperature dependent electrical resistivity of perovskite nickelate (e.g. $SmNiO_3$ (SNO)) upon electric field sensing. After being submerged in 0.6 M NaCl for 24 h at room temperature, the electrical resistivity of SNO is similar to the pristine one, indicating their robustness in water. The electrical resistivity increases after applying negative bias of –2.0 V in 0.6 M NaCl for 5 min. The sample is then treated under reverse bias of 2.0 V for 10 min, where its electrical resistivity curve is recovered to nearly the original state. The temperature-dependent electrical resistivity comparing pristine SNO and a SNO thin film submerged for 24 h in 0.6 M NaCl (M stands for mol/L) at room temperature. Nearly identical resistivity-temperature curves are observed in both samples, confirming the stability. The electrical resistivity of SNO after applying negative electric potential up to –4.0 V (vs. Ag/AgCl) in 0.6 M NaCl, the salinity of which is similar to seawater. Upon application of negative electric potential, the electrical resistivity of SNO exhibits more than 5 orders of magnitude increase. The resistivity of water-treated SNO decreases smoothly with increasing temperature indicating an insulating state with localized electrons.

Figure 2D:
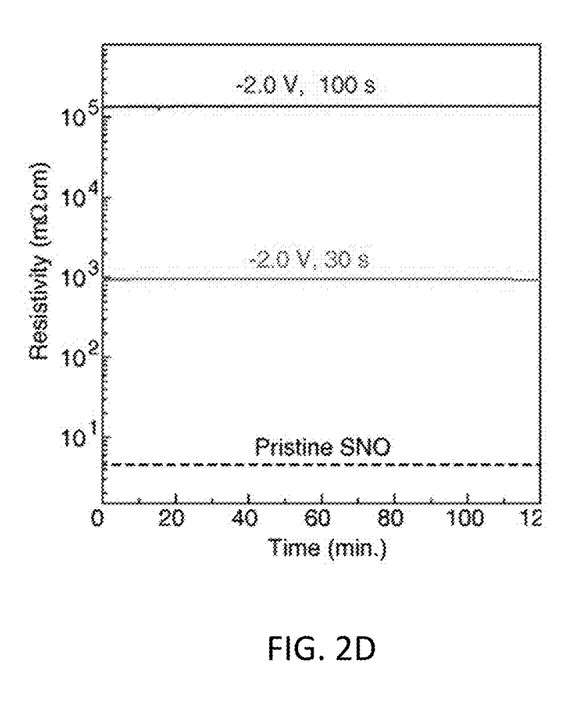
FIG. 2D shows non-volatile behavior of perovskite nickelate (e.g. SmNiO$_3$ (SNO)) thin film after applying −2.0 V in 0.6 M NaCl for various duration.
Figure 2E:
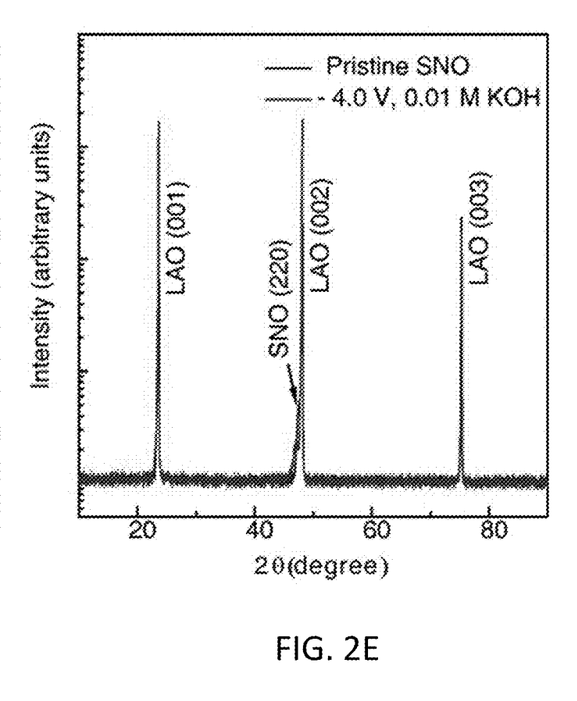
FIG. 2E shows X-ray diffraction profiles of perovskite nickelate (e.g. SmNiO$_3$ (SNO)) in present and water-treated state over wide 2θ range. No new peaks appear indicate the robust nature of perovskite nickelate during electric field sensing.

FIG. 2D shows non-volatile behavior of perovskite nickelate (e.g. $SmNiO_3$ (SNO)) thin film after applying –2.0 V in 0.6 M NaCl for various duration. The resistivity of perovskite nickelate thin film after sensing electric potential remains unchanged for 120 min, which demonstrates its non-volatile nature being distinct from the surface electrostatic field effect in electric double layer transistors. Referring to FIG. 2D, the massive change of electrical properties of water-treated SNO are non-volatile at ambient conditions, indicates that it is not simply an electrostatic field-effect due to charge accumulation at the surface but a water-mediated phase transition. FIG. 2E shows X-ray diffraction profiles of perovskite nickelate (e.g. $SmNiO_3$ (SNO)) in present and water-treated state over wide 2θ range. Referring to FIG. 2E, no new peaks appear indicate the robust nature of perovskite nickelate during electric field sensing. The (220) peak of pristine SNO shifts to lower 2θ angle after sensing electric field, indicating a lattice expansion which accommodates the proton interaction upon sensing. The observed phase change occurs in general regardless of aqueous solution (three examples include 0.01 M KOH, 0.6 M NaCl, 0.01M citric acid) and substrate [e.g. $LaAlO_3$ (001) and Si (100)] utilized.

Figure 3A:
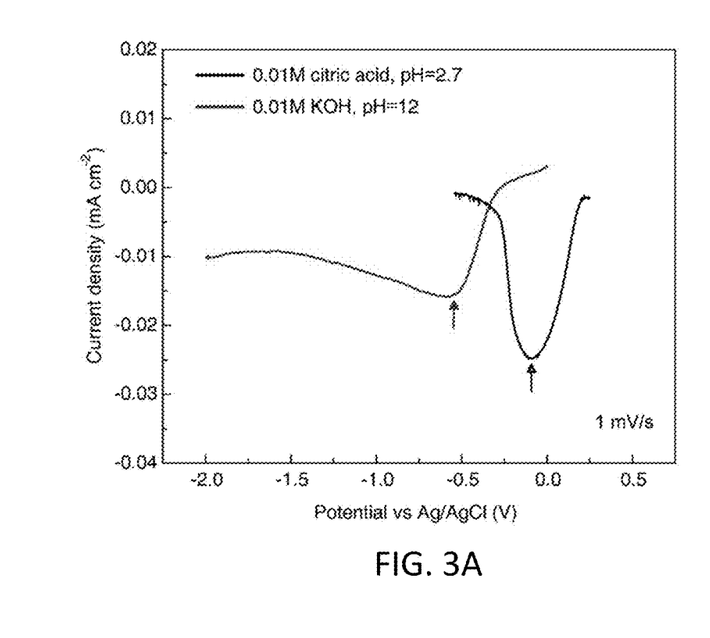
FIG. 3A shows dependence of water-mediated phase transition in perovskite nickelate (e.g. SmNiO$_3$ (SNO)) on pH values spanning from acidic solution (0.01 M citric acid, pH=2.7) to basic solution (0.01 M KOH, pH=12).
Figure 3B:
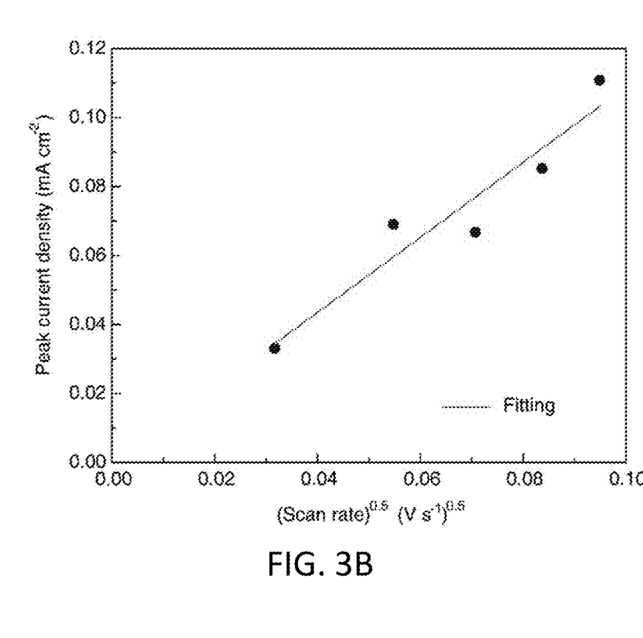
FIG. 3B is linear relationship between peak cathodic current density ($I_p/A$) and square root of scan rate ($v^{0.5}$).

FIG. 3A shows electrochemical characterization of perovskite nickelates during sensing through dependence of water-mediated phase transition in perovskite nickelate (e.g. $SmNiO_3$ (SNO)) on pH values spanning from acidic solution (0.01 M citric acid, pH=2.7) to basic solution (0.01 M KOH, pH=12). Referring to FIG. 3A, the transition from SNO to HSNO shifts to more negative potential values with increasing pH, where greater bias is required to compensate the reduction of the proton activity in the basic solutions. Charge transfer is observed during water-mediated phase transition of perovskite nickelates (e.g., $SmNiO_3$ (SNO)). Cathodic current peak appears in cyclic voltammograms of perovskite nickelates at negative potentials, indicating the occurrence of reduction reaction. The magnitude of electric potential to trigger the reduction reaction of perovskite nickelates increases with increasing pH value, indicating the close relationship between water-mediated conductance modulation and the activity of protons in aqueous solutions. The fitting of scan rate dependence of cathodic current peak to Randles-Sevcik equation indicates that Ni3+ in the sensing media perovskite nickelates is almost fully reduced to Ni2+ after the reaction. FIG. 3B shows the linear relationship between peak cathodic current density ($I_p/A$) and square root of scan rate ($v^{0.5}$). Referring to FIG. 3B, the best fit to the Randles-Sevcik equation gives an estimate of the number of electrons transferred in the rate limiting step as 0.95, indicating that the Ni in the perovskite nickelate (e.g. $SmNiO_3$ (SNO)) is almost fully reduced from Ni3+ to Ni2+ upon intercalation.

Figure 4A:
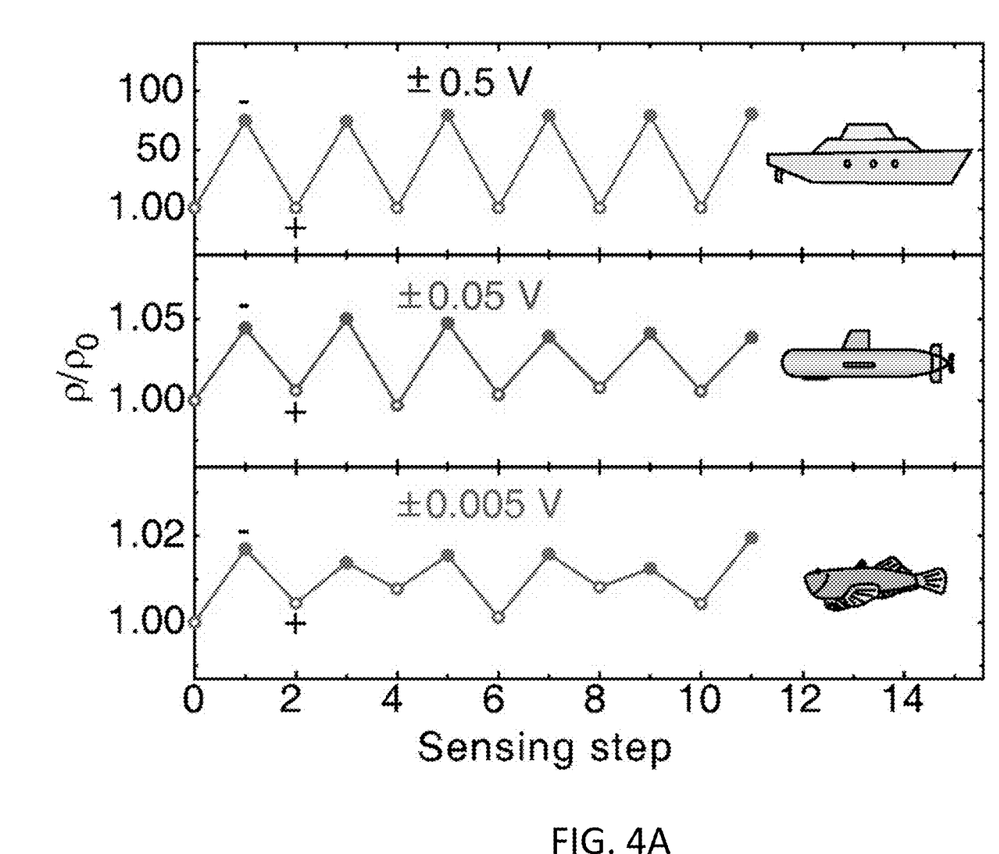
FIG. 4A is representation of modulation of normalized electrical resistivity of perovskite nickelate (e.g. SmNiO$_3$ (SNO)) in aqueous environment after bias potential application over multiple sensing steps.

FIG. 4A is representation of modulation of normalized electrical resistivity of perovskite nickelate (e.g. SmNiO$_3$ (SNO)) in aqueous environment after bias potential application over multiple sensing steps. The normalized resistivity is defined as $\rho/\rho_0$, where $\rho_0$ is initial resistivity and p is resistivity after sensing the electric field. Referring to FIG. 4A, the bias potentials applied were ±0.5 V, ±0.05 V, and ±0.005 V, corresponding to ships, submarines and fish respectively as shown schematically in FIG. 4A. The time duration of application of bias in each case was 10 s. The aqueous environment was 0.6 M NaCl with salinity close to seawater. The normalized resistivity increases and then decreases following the reversal of bias potential. The reversibility of water-mediated phase transition and the facile migration of protons enable perovskite nickelate to detect the local fluctuation of electric signals in water. Such a sensing capability persists over multiple cycles, indicating their robustness in aqueous environment. Under applied electric field, the perovskite nickelates sensing device shows substantial modulation in its electrical resistivity. The electrical resistivity of the sensing medium changes accompanied with the variation of external electric bias. Moreover, the sensing behavior of such a sensing device is observed over multiple sensing cycles, indicating robustness and reliability of present sensing device. By sensing external electric bias above the level of microvolts, such sensing devices can detect electric fields emitted by manmade vessels and marine organisms, demonstrating their ultrahigh sensitivity. The high sensitivity of the devices enables a detection distance of tens centimeters and detectable frequency up to 10 Hz, which is within similar range as the electroreception organs of sharks. Longer detection distance and higher frequency range can be obtained by enhancing the sensitivity of the device further with geometric shaping of the sensing medium as shown in paragraph [0035] above and reduction in film thickness.

Figure 4B:
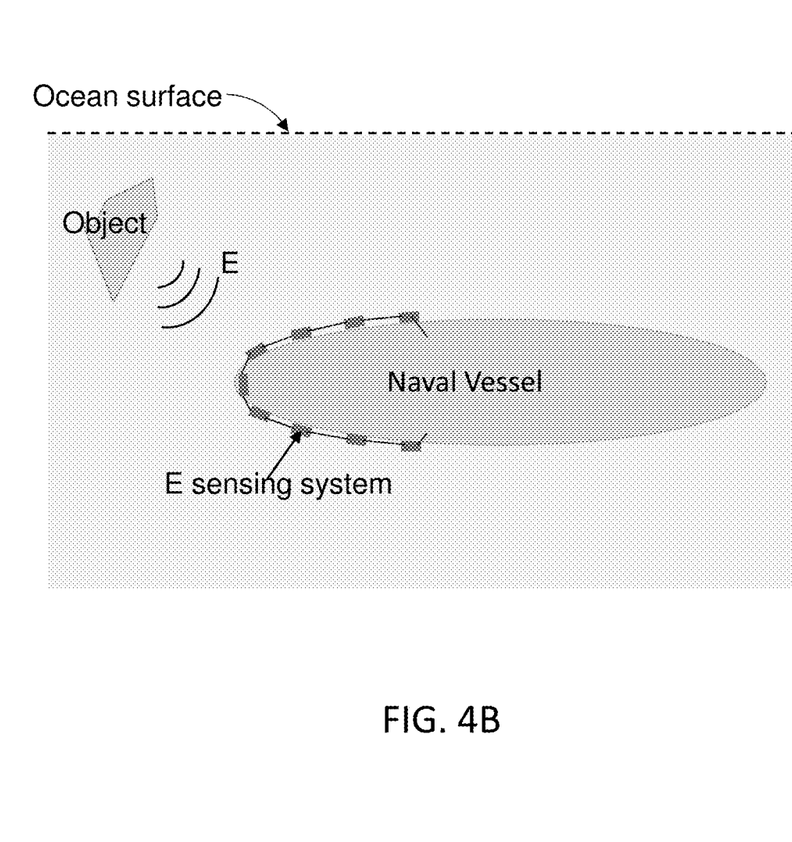
FIG. 4B is a schematic representation of an electric field sensing system of this disclosure, which is placed on the surface of an underwater naval vessel, wherein the system contains tens to thousands of thin film electric field sensing devices made from perovskite nickelates.

FIG. 4B is a schematic representation of one embodiment of an electric field sensing system of this disclosure, contained in a naval vessel floating or submerged in a body of water, such as an ocean. The system can contain several (from a few to several tens to thousands, though only a few arte shown in FIG. 4B for illustrative purposes) electric field sensing devices of this disclosure, which can be advantageously made from perovskite nickelates. These devices are advantageously mounted on the surface of naval vessel as schematically shown in FIG. 4B and labeled E-sensing system, so that there is a medium (in this case water) for continuous ionic conductivity from the object (labeled in FIG. 4B) emitting the electric field to each of the sensing devices. The system monitors the underwater objects by detecting their electric field emitted, shown in FIG. 4B illustratively as E; the signals on resistance modulation of devices can be transmitted in wireless manner. The electric field sensing system made by connection of several electric field sensing devices (such as shown in FIG. 1A) contained on the surface of undersea naval vessel is shown schematically in FIG. 4B. In similar manner as the electroreception organ appearing near the mouth of sharks, the naval vessel can contain the electric filed sensing system. Because of a specific geometric arrangement can be chosen, the system has the capability of detecting the spatial information of objects through their naturally emitted electric fields. This sensing system contained in such a naval vessel starts to work whence in contact with aqueous environment (e.g. whence the naval vessel is launched into oceans), based on the mechanism of the sensing medium disclosed in this disclosure. By monitoring the electrical resistivity modulation of each individual sensor device, such an electric field sensing system enables to detect the detailed location of objects in aqueous environment (e.g. oceans) by monitoring the difference of resistance change of devices pair placed at opposite positions on the surface. The information obtained by the electric field sensing system can then be transmitted wirelessly through satellite and finally utilized to remotely sense the complex dynamic environment of aqueous environment such as oceans, rivers, and lakes. While FIG. 4B shows a naval vessel for illustrative purposes, in some embodiments of the disclosure, the naval vessel can be replaced by one or more an autonomous vehicles, either floating or submersed.

Figure 5A:
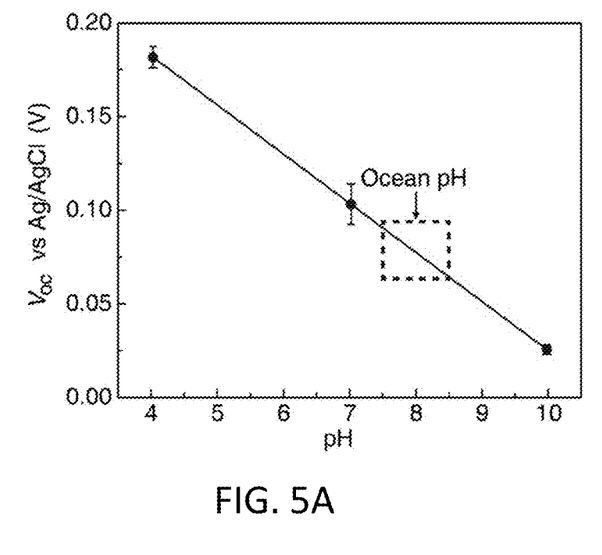
FIG. 5A shows open circuit potential ($V_{OC}$) of perovskite nickelate (e.g. SmNiO$_3$ (SNO)) relative to standard Ag/AgCl electrode in standard aqueous buffers with pH values covering the pH range of earth's oceans.
Figure 5B:
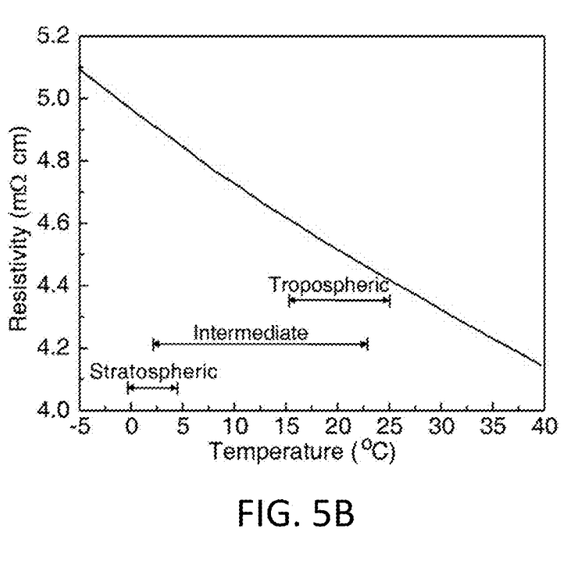
FIG. 5B shows temperature-dependent electrical resistivity of perovskite nickelate (e.g. SmNiO$_3$ (SNO)) covering the temperature range of earth's oceans.

FIGS. 5A and 5B show the pH and temperature sensing capability of sensing media (perovskite nickelates) which enable sensing media to operate as local environmental sensors. FIG. 5A shows open circuit potential ($V_{OC}$) of perovskite nickelate (e.g. SmNiO$_3$ (SNO)) relative to standard Ag/AgCl electrode in standard aqueous buffers with pH values covering the pH range of earth's oceans. Error bar shows the standard deviations. The $V_{OC}$ decreases with increasing pH monotonically. Referring to FIG. 5A, the linear relationship between proton activity (and corresponding surface adsorption) and $V_{OC}$ enables perovskite nickelate as a pH sensor. FIG. 5B shows temperature-dependent electrical resistivity of perovskite nickelates (e.g., SmNiO$_3$ (SNO)) covering the temperature range of earth's oceans. Referring to FIG. 5B, The electrical resistivity increases with cooling, consistent with its insulating nature around room temperature, which enables perovskite nickelates to function as a thermistor. Thus FIGS. 5A and 5B also indicate that the sensing media of this disclosure can be utilized as pH sensors and temperature sensors temperature sensors.

Described above in this disclosure is an electric field sensing system operable in wide range of aqueous/liquid environment. Such a new sensing system could be used not only for sensors on autonomous vehicles employed to survey marine environments, but also as an alternative method for seafaring vessels recognition to more conventional techniques such as SONAR owing to their light weight, silent operations that do not disturb the aquatic life, low energy consumption, and capable of system-on-a-chip design. Numerous applications are envisioned for maritime monitoring of aquatic vessels and unraveling properties of water bodies.

Based on the above description, it is an objective of this disclosure to describe an electric field sensing device containing a substrate, a sensing medium deposited on the substrate that is capable of experiencing a change in its electrical resistivity in response to an electric field emitted by an object, two or more contact electrodes in contact with the sensing medium, and an optional capping layer capable of encapsulating the substrate, the sensing medium and the two electrodes. In application, the sensing device is typically used along with a measurement system to measure a signal or a parameter relating the sensing of the electric field by the sensing device. A non-limiting example of a measuring system includes a meter including power supply, the meter being capable of reading the electrical resistance modulation of the sensing medium. In some embodiments the number of electrodes can be two while in some embodiments, utilizing a 4-point measurement system for measuring the resistance of the sensing medium, the number of electrodes can be four. In some embodiments of the sensing device of this disclosure, substrate is an electrical conductor. Examples of substrates that are electrical conductor and suitable for use as a substrate for the sensing device of this disclosure include, but not limited to ITO, Nb—SrTiO$_3$, a metal and an alloy. In some embodiments of the sensing device of this disclosure, substrate is an electrical insulator. Examples of substrates that are electrical insulators and suitable for use as a substrate for the sensing device of this disclosure include, but not limited to, Si, Si$_3$N$_4$, SiO$_2$, and. LaAlO$_3$. In some embodiments of the sensing device of this disclosure, the substrate thickness is in the range of 20 nm-2.0 mm. In some embodiments of the electric field sensing device of this disclosure, sensing medium comprises a perovskite nickelate of the chemical form RNiO$_3$. In some embodiments of the electric field sensing device of this disclosure, the thickness of the sensing medium is in the range of 0.3 nm-10 micrometers. In some embodiments of the sensing device of this disclosure, in the chemical form RNiO$_3$, R is a rare earth element, such as, but not limited to Sm, Nd, Eu, Gd, Dy, Y, Lu, Pr, and La. In some embodiments of the sensing device of this disclosure, the electrodes in contact with the sensing medium are made from one of Pt, Au, Pd, and Ag. In some embodiments of this disclosure, the capping layer is a proton conductive material. Examples of materials for use as a proton conductive material include, but not limited to NAFION®, Teflon®, proton conductive oxide Cr$_2$O$_3$, and yttrium-doped barium zirconate (BYZ). In some embodiments of the sensing device of this disclosure, the capping layer has a thickness in the range of 0.3 nm to 2 micrometers.

It is also an objective of this disclosure to describe a method of making an electric field sensing device. The method includes providing a substrate, depositing a sensing medium capable of experiencing a change in its electrical resistivity in response to an electric field emitted by an object on the substrate by physical or chemical vapor deposition or solution deposition, and placing two or more electrodes in contact with the sensing medium such that the two or more electrodes are configured to be utilized in measuring the change in electrical resistivity of the sensing medium in response to an electric field. Optional additional steps of the method include encapsulating an assembly comprising the substrate, the two or more electrodes and the sensing medium with a capping layer. In some embodiments of the method, the sensing medium comprises a perovskite nickelate of the chemical form RNiO3, where R is a rare earth element. Some elements that can take the place of R include but not limited to Sm, Nd, Eu, Gd, Dy, Y, Lu, Pr, and La.

It is yet another objective of this disclosure to describe an electric field sensing system. The electric field sensing system of this disclosure contains a plurality of electric field sensing devices, wherein each electric field sensing device contains a substrate, a sensing medium deposited on the substrate that is capable of experiencing a change in its electrical resistivity in response to an electric field emitted by an object, two or more contact electrodes in contact with the sensing medium such that the two or more electrodes are configured to be utilized in measuring the change in electrical resistivity of the sensing medium in response to an electric field, and an optional capping layer capable of encapsulating the substrate, the sensing medium and the two electrodes; an arrangement of the plurality sensing devices in a way to detect spatial variation of electric field emitted by objects in an environment; a computer system capable of monitoring the sensing devices for the electric fields received by the devices, and detecting and comparing differences between the electrical fields sensed by individual devices. In some embodiments of the electric field sensing system of this disclosure, the sensing medium comprises a perovskite nickelate of the chemical form RNiO3. In some electrical field sensing systems, in the chemical form RNiO3, R is a rare earth element, such as, but not limited to Sm, Nd, Eu, Gd, Dy, Y, Lu, Pr, and La. In some embodiments of the electric field sensing system of this disclosure, there can be more than one electric field sensing device. In such cases, where a plurality of the electric field sensing devices are present, the number of the electric field sensing devices can be in the non-limiting range of 2-100,000. In some embodiments of the electric field sensing system of this disclosure, the environment can be a body of water, such as, but not limited to a pond, a lake, a river, a sea or an ocean. The body of water can be on earth or on other planets or asteroids or inside vehicles that can travel across space. In some embodiments of the disclosure, the environment can be a body of a liquid other than water.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular embodiments described. Other implementations may be possible.

The invention claimed is:

1. A submersible electric field sensing device comprising:
   a substrate;
   a sensing medium deposited on the substrate, wherein the sensing medium experiences a change in its electrical resistivity in response to a presence of an electric field emitted by an object and propagated through liquid;
   two or more electrodes configured to be utilized in measuring the change in electrical resistivity of the sensing medium in response to the electric field; and
   a capping film deposited on top of the substrate, sensing medium, and electrodes,
   wherein the sensing medium and the two or more electrodes are completely encapsulated between the capping film and substrate,
   wherein the sensing medium comprises a perovskite nickelate of the chemical form RNiO3.

2. The electric field sensing device of claim 1, wherein the substrate is an electrical conductor.

3. The electric field sensing device of claim 2, wherein the electrical conductor is one of ITO, Nb—SrTiO$_3$, a metal and an alloy.

4. The electric field sensing device of claim 1, wherein the substrate is an electrical insulator.

5. The electric field sensing device of claim 4, wherein the electrical insulator is one of Si, Si$_3$N$_4$, SiO$_2$, LaAlO$_3$.

6. The electric field sensing device of claim 1, wherein the sensing medium comprises a perovskite nickelate of the chemical form RNiO3.

7. The electric field sensing device of claim 6, wherein R is a rare earth element.

8. The electric field sensing device of claim 7, wherein R is one of Sm, Nd, Eu, Gd, Dy, Y, Lu, Pr, and La.

9. The electric field sensing device of claim 1, wherein the electrodes in contact with the sensing medium are made from one of Pt, Au, Pd, and Ag.

10. The electric field sensing device of claim 1, wherein the capping layer is a proton conductive material.

11. The electric field sensing device of claim 10, wherein the proton conductive material is one of NAFION®, Teflon®, proton conductive oxide Cr$_2$O$_3$, and yttrium-doped barium zirconate (BYZ).

12. A method of making an electric field sensing device comprising:

providing a substrate;

depositing on the substrate by physical or chemical vapor deposition or solution deposition methods a sensing medium experiences a change in its electrical resistivity in response to an electric field emitted by an object, the sensing medium comprises a perovskite nickelate of the chemical form RNiO3; and placing two or more electrodes configured to be utilized in measuring the change in electrical resistivity of the sensing medium in response to the electric field;

applying a capping layer to completely encapsulate the two or more electrodes and the sensing medium exposed on the substrate.

13. The method of claim 12, wherein R is a rare earth element.

14. The method of claim 13, wherein R is one of Sm, Nd, Eu, Gd, Dy, Y, Lu, Pr, and La.

15. An electric field sensing system comprising:

a plurality electric field sensing devices submersible in a liquid environment, wherein each of the electric field sensing devices contains a substrate, a sensing medium deposited on the substrate, wherein the sensing medium experiences a change in its electrical resistivity in response to an electric field propagated through the liquid environment, two or more electrodes configured to be utilized in measuring the change in electrical resistivity of the sensing medium in response to the electric field, and a capping layer encapsulating all of the exposed portions of the sensing medium and the two or more electrodes;

an arrangement of the plurality of the sensing devices in such a way as to detect spatial variation of electric field emitted by objects in the liquid environment; and a computer system capable of monitoring the plurality of the sensing devices, and detecting and comparing differences between individual devices.

16. The electric field sensing system of claim 15, wherein the plurality of electric field sensing devices ranges is in the range 2-100,000.

17. The electric field sensing system of claim 15, wherein the wherein the sensing medium comprises a perovskite nickelate of the chemical form RNiO3.

18. The electric field sensing system of claim 17, wherein R is a rare earth element.

19. The electric field sensing system of claim 18, wherein R is one of Sm, Nd, Eu, Gd, Dy, Y, Lu, Pr, and La.

20. The electric field sensing system of claim 15, wherein the environment is a body of a water or a body of a liquid other than water.

21. The electric field sensing system of claim 20, wherein the body of water is one of a pond, river, lake, and ocean.

* * * * *